J. McGREGOR, DEC'D.
M. McGREGOR, ADMINISTRATRIX.
INTERNAL EXPANSION SELF TIGHTENING CHUCK.
APPLICATION FILED MAR. 15, 1917.
1,245,251. Patented Nov. 6, 1917.
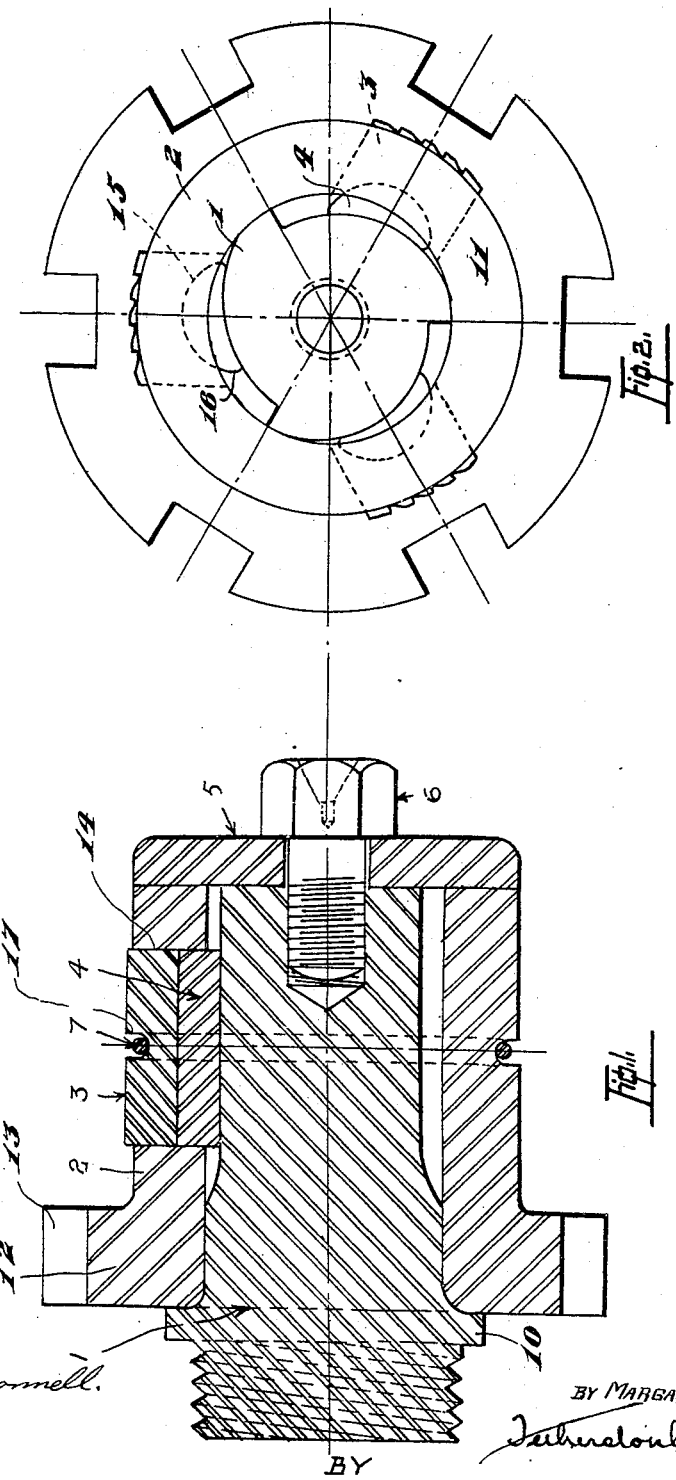

UNITED STATES PATENT OFFICE.

JOHN McGREGOR, DECEASED, LATE OF ST. JOHN, NEW BRUNSWICK, CANADA, BY MARGARET McGREGOR, ADMINISTRATRIX, OF ST. JOHN, NEW BRUNSWICK, CANADA.

INTERNAL-EXPANSION SELF-TIGHTENING CHUCK.

1,245,251.   Specification of Letters Patent.   Patented Nov. 6, 1917.

Application filed March 15, 1917. Serial No. 155,130.

*To all whom it may concern:*

Be it known that JOHN McGREGOR, late of St. John, in the county of St. John, in the Province of New Brunswick and Dominion of Canada, mechanical engineer, invented certain new and useful Improvements in Internal-Expansion Self-Tightening Chucks, of which the following is a specification.

This invention relates to improvements in chucks and the objects of the invention are to permit of the jaws of the chuck being automatically actuated to engage self-centering a piece of work to renew the chuck capable of being utilized on hollow or solid spindle machines, to simplify the construction of the chuck and generally to adapt the several parts to better perform the functions required of them, and it consists essentially of the improved construction particularly described and set forth in the following specifications and accompanying drawings forming part of the same.

In the drawings,

Figure 1 is a longitudinal section of the improved chuck.

Fig. 2 is an end view of the same.

Like characters of reference refer to like parts in the several figures.

Referring to the drawings, 1 represents a spindle provided intermediate of its length with a flange 10, one end of the spindle being threaded to engage with the face plate of a lathe, the other end being provided with a plurality of equidistantly spaced cam faces 11, the object of which will be made clear hereafter.

Rotatably mounted on the spindle 1, is a sleeve 2, provided at one end with a radial flange 12, having a plurality of notches 13 in the periphery thereof, the said sleeve being provided intermediate of its length with a plurality of equidistantly spaced orifices 14 in which the jaws 3 are slidably mounted.

These jaws are provided on their inner end with a curvilinear or semi-circular recess 15, adapted to engage with the outer curvilinear or semi-circular face of the adjusting member 16, the inner concave face of which is formed with the same radius of curvature as the cam faces 11.

The sleeve 2 is held in position by means of a washer 5 which passes through the pin 6 making threaded engagement with the end of the spindle 1. The jaws 3 are also provided with grooves 17, with which the resilient rings 7 engage to normally retain the jaws in the desired position.

The assembly of the chuck will be readily understood from the foregoing description. This chuck is designed when in use for holding any work to be trued by inside when being machined on the outside and the said work, when positioned embraces the sleeve 2 which, when manually rotated moves the jaws 3 radially outwardly to engage with the inner periphery of the piece of work.

When the machine has been started it will be clearly seen that the tendency of the spindle 1, to revolve forces the adjusting piece 16 radially outwardly automatically causing the jaws 3 to firmly engage the inner periphery of the piece of work and when the tool is brought to bear upon the piece of work being turned the jaws bite more firmly into the same, so that there is no liability of the work inadvertently slipping.

After the work has been completed and it is desired to remove the same the recesses 13 in the flange 12, are engaged by a spanner and the sleeve rotated to disengage the jaws 3 from the piece of work which is then removed, the inward radial movement of the jaws being controlled by the resilient rings 7.

From this description it will be seen that a chuck has been invented which may be advantageously utilized in munition work and the like wherein the work is automatically self centered and there is no liability of its running out of the truth no matter how heavy a cut is brought to bear upon the same.

As many changes could be made in the above construction and many apparently widely different embodiments of my invention constructed within the scope of the claims, without departing from the spirit or scope thereof, it is intended that all matter contained in the accompanying specification and drawings shall be interpreted as illustrative and not in a limiting sense.

What is claimed as the invention is:

1. In a chuck and in combination, a spindle having a plurality equidistantly spaced cam faces, a sleeve rotatably mounted on the said spindle, having a plurality of radially extending orifices, provided with semi-circular recesses in the inner end, adjusting members having the outer face semi-circular and the inner face having the same radius of curvature as the said cam faces adapted to engage with the said jaws and cam faces respectively.

2. In a chuck and in combination a spindle having a plurality of equidistantly spaced cam faces, a sleeve having a radial flange provided with recesses rotatably mounted on the spindle and having a plurality of radially extending orifices, jaws slidably mounted in the orifices having serrations in the outer faces and curved recesses in the inner faces adjusting members intermediate of the cam faces in the said recesses formed complementary to the curved recesses and adapted to slidably support the jaws and resilient means for normally holding the jaws in position.

3. In a chuck and in combination, a spindle having a plurality of cam faces, a sleeve rotatably mounted in the spindle having a plurality of radial orifices therethrough, jaws slidably mounted in the orifices having rings in the inner face, adjusting members intermediate of the jaws and the cam faces and encircling a spring ring surrounding the said jaws and the sleeve.

In testimony whereof I have signed at the town of New Glasgow, Province of Nova Scotia, Dominion of Canada, this 16th day of July, 1917.

MARGARET McGREGOR,
*Executrix of the estate of John McGregor, deceased.*
In the presence of —
A. McGregor,
John Bull.

Copies of this patent may be obtained for five cents each, by addressing the "Commissioner of Patents, Washington, D. C."